United States Patent
Nanbu et al.

[11] Patent Number: 5,502,365
[45] Date of Patent: Mar. 26, 1996

[54] DRIVING CONTROL APPARATUS OF MOTOR-DRIVEN COMPRESSOR UTILIZED FOR AUTOMOBILE

[75] Inventors: Yasuo Nanbu, Oono; Makoto Yoshida, Kusatsu, both of Japan

[73] Assignee: Matsushita Electric Industrial Co., Ltd., Japan

[21] Appl. No.: 113,470

[22] Filed: Aug. 30, 1993

[30] Foreign Application Priority Data

Aug. 31, 1992  [JP]  Japan .................... 4-230945

[51] Int. Cl.⁶ .................................................. H02P 5/28
[52] U.S. Cl. .......................... 318/798; 318/139; 318/799; 318/800; 318/801
[58] Field of Search ........................ 318/139, 798, 318/799, 800, 801–812; 180/53.1

[56] References Cited

U.S. PATENT DOCUMENTS

| 4,472,666 | 9/1984 | Akeda et al. | 318/139 |
| 4,634,941 | 1/1987 | Klimo | 318/139 |

FOREIGN PATENT DOCUMENTS 1-218917  9/1989  Japan .

Primary Examiner—William M. Shoop, Jr.
Assistant Examiner—Karen Masih
Attorney, Agent, or Firm—Parkhurst, Wendel & Rossi

[57] ABSTRACT

A driving control apparatus consists of a battery for storing electric energy supplied to a motor-driven compressor and a drive motor, a direct current detector for detecting a direct current supplied from the battery to the compressor, a direct current voltage detector for detecting a d.c. voltage applied by the battery, a controller for calculating an electric power consumed by the motor-driven compressor, determining an upper limit of the electric power in dependence on the d.c. voltage, judging whether or not the electric power is larger than the upper limit, and controlling the compressor to reduce the electric power in cases where the electric power is larger than the upper limit. Because the upper limit of the electric power is determined in dependence on the d.c. voltage and because the electric power becomes necessarily lower than the upper limit, an electric tar is not stalled by the exhaustion of the electric power in the battery before a driver arrives at his destination. Also, air conditioning in the electric motorcar can be efficiently performed. Therefore, the driver and passengers can find pleasure in comfortable travelling.

10 Claims, 5 Drawing Sheets

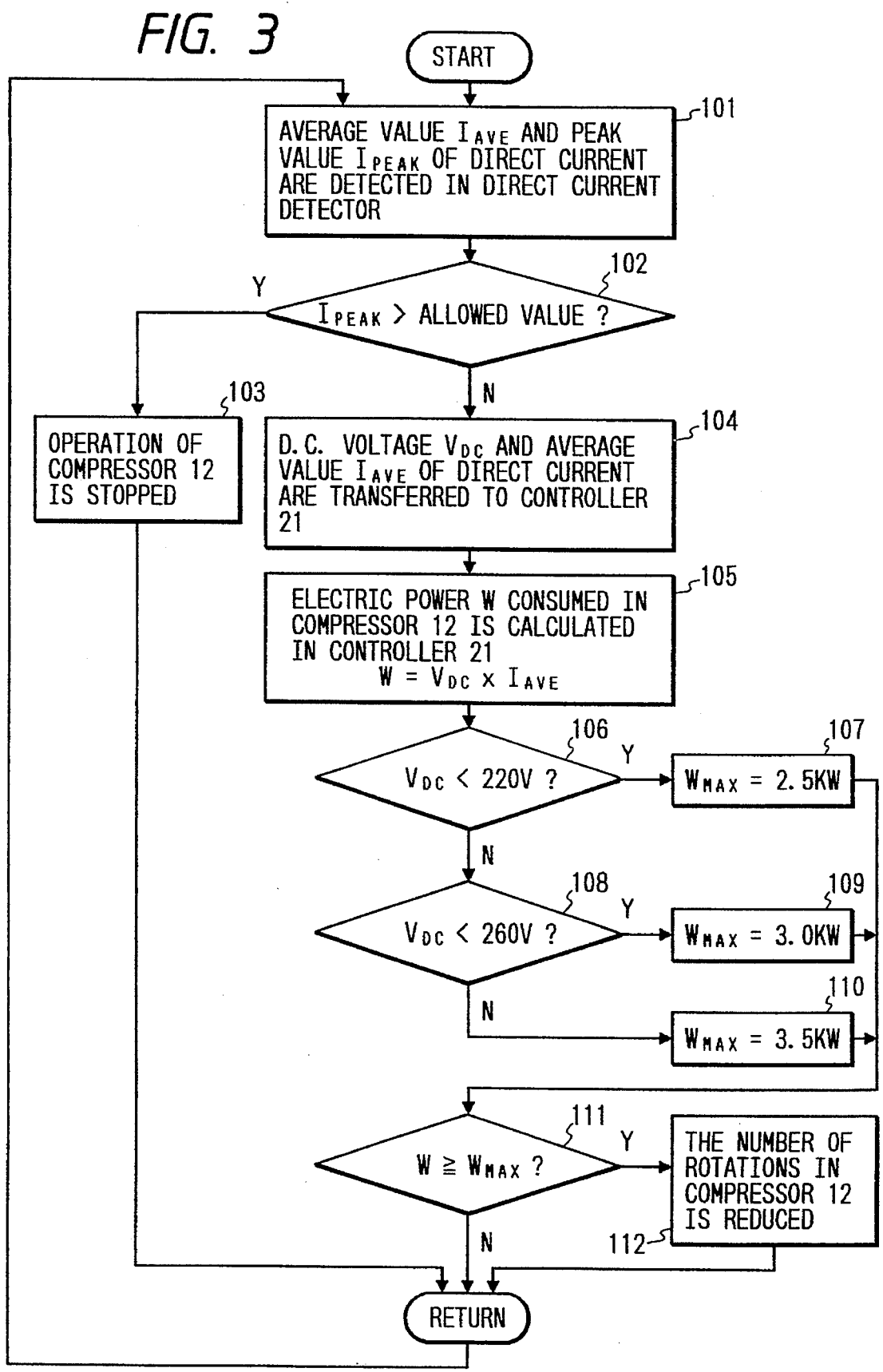

DRIVING CONTROL APPARATUS OF MOTOR-DRIVEN COMPRESSOR UTILIZED FOR AUTOMOBILE

BACKGROUND OF THE INVENTION

1. Field of the Invention

The present invention relates to a driving control apparatus for controlling the driving of a motor-driven compressor mounted on an automobile.

2. Description of the Related Art

A battery is utilized as an electric source to run an automobile such as an electric motorcar, and a travelling distance of the electric motorcar depends on a battery capacity. The battery is utilized to supply an electric power to not only a drive motor but also a motor-driven compressor which is utilized for air conditioning. Also, an electric generator is utilized to supply an electric source to the motor-driven compressor in the automobile such as a gasoline Car.

Therefore, an electric power supplied to the motor-driven compressor is controlled by a conventional driving control apparatus to prevent the motor-driven compressor from burning out. For example, a conventional driving control apparatus of a motor-driven compressor was laid open to public inspection under Provisional Publication No. 218917/89 (H1218917). In the conventional driving control apparatus of Provisional Publication No. 218917/89, in cases where an output alternating current of an inverter arranged between the battery or the electric power generator and the motor-driven compressor is larger than a limited value, a ratio of an output frequency of the inverter to an output voltage of the inverter is lowered to reduce the output alternating current of the inverter to less than the limited value. Accordingly, the motor-driven compressor is protected from burning out.

3. Problems to be Solved by the Invention

However, because the battery is utilized to supply the electric power to not only the drive motor but also the motor-driven compressor in the electric motorcar, an electric energy stored in the battery is exhausted unless an electric power consumed by the motor-driven compressor is limited in some way. As a result, the electric motorcar stops running before a driver arrives at his destination. Also, because the electric generator is utilized to supply an electric power to the motor-driven compressor in the gasoline car, the electric generator is overloaded unless the electric power consumed by the motor-driven compressor is limited in some way. As a result, the electric generator burns out.

In the conventional driving control apparatus, the electric power supplied to the motor-driven compressor is controlled by detecting only the output alternating current of the inverter. Therefore, though the motor-driven compressor and power transistors utilized to convert a direct current voltage applied by the battery or the electric generator into an alternating current voltage applied to the motor-driven compressor can be protected, the battery or the electric generator is not protected from the exhaustion of the electric power or the overload on the electric generator.

SUMMARY OF THE INVENTION

An object of the present invention is to provide, with due consideration to the drawbacks of such a conventional driving control apparatus, a driving control apparatus of a motor-driven compressor in which the electric car is not stalled by the exhaustion of the electric power in the battery or the overload on the electric generator is prevented in the gasoline car while protecting the motor-driven compressor and the power transistors. Another additional object is to provide a driving control apparatus of a motor-driven compressor in which the drivability of a driver is improved and the driver enjoys his comfortable travelling.

The object is achieved by the provision of a driving control apparatus for supplying electric power to a motor-driven compressor mounted on an automobile, comprising: electric source means for storing an electric energy to supply the electric power to the motor-driven compressor; direct current detecting means for detecting a direct current supplied from the electric source means to the motor-driven compressor; direct current voltage detecting means for detecting a d.c. voltage of the direct current supplied from the electric source means, the d.c. voltage being applied to the motor-driven compressor; and control means for calculating an electric power consumed by the motor-driven compressor, and controlling the motor-driven compressor to reduce the electric power in cases where the electric power is larger than an upper limit of the electric power, the electric power being defined as a product of the direct current detected by the direct current detecting means and the d.c. voltage detected by the direct current voltage detecting means.

In the above configuration, the direct current supplied from the electric source means to the motor-driven compressor is detected by the direct current detecting means, and the d.c. voltage of the direct current is detected by the direct current voltage detecting means. Thereafter, the electric power expected to be consumed by the motor-driven compressor is calculated in the control means.

In cases where the electric power is larger than the upper limit of the electric power, there is a probability that the automobile such as an electric car stops running before a driver arrives at his destination because the electric energy stored in the electric source means is exhausted. Also, there is a probability that the electric source means is overloaded and burns out in the automobile such as a gasoline car. To avoid the exhaustion or the overload, the motor-driven compressor is controlled by the control means to reduce the electric power consumed in the motor-driven compressor to less than the upper limit.

Accordingly, because the electric power consumed in tile compressor is necessarily lower than the upper limit, the automobile such as an electric car is not stalled by the exhaustion of the electric energy stored in the battery before the driver arrives at his destination. Also, the electric source means such as an electric generator is not overloaded in the automobile such as a gasoline car.

It is preferred that the direct current detecting means comprise a peak direct current detecting circuit for detecting a peak value of the direct current and an average direct current detecting circuit for detecting an average value of the direct current, the electric power being defined as a product of the average value of the direct current and the d.c. voltage, and an operation of the motor-driven compressor being stopped under control of the control means in cases where the peak value of the direct current is higher than an upper limit of the peak value.

In the above configuration, because the peak value of the direct current is detected by the peak direct current detecting circuit and because the motor-driven compressor stops operating in cases where the peak value of the direct current is higher than the upper limit of the peak value, power transistors of a converter utilized to operate the motor-driven compressor can be protected Also, it is preferred that the upper limit of the second electric power be determined by the control means in dependence on the d.c. voltage detected by the direct current voltage detecting means.

In the above configuration, the upper limit of the second electric power is determined in dependence on the d.c. voltage. In this case, even though the d.c. voltage greatly shifts, the direct current supplied to the motor-driven compressor can be kept constant. Therefore, the motor-driven compressor and power transisters of an inverter utilized to operate the compressor can be protected from burning out, and the air conditioning of the motor-driven compressor can be efficiently performed. Therefore, the driver and passengers can find pleasure in comfortable travelling.

Also, it is preferred to additionally include electric power selecting means for selecting either a first upper limit or a second upper limit higher than the first upper limit as the upper limit of the second electric power.

In the above configuration, the first upper limit is determined to give priority to an operation of a drive motor utilized to run the automobile, and the second upper limit is determined to give priority to an operation of the motor-driven compressor. Also, the first or second upper limit selected by the electric power selecting means is compared with the electric power in the control means to judge whether or not the electric power is reduced.

Accordingly, in cases where a driver selects a first upper limit, a sufficient electric power can be consumed to operate the drive motor in an electric car. Therefore, drivability of the driver can be improved. In contrast, in cases where the driver selects a second upper limit, a sufficient electric power can be consumed for the air conditioning in the electric car. Therefore, the driver and passengers can find pleasure in comfortable travelling.

The object is also achieved by the provision of a driving control apparatus for supplying electric power to a motor-driven compressor mounted on an automobile, comprising:

electric source means for storing an electric energy to supply the electric power to the motor-driven compressor;

average direct current detecting means for detecting an average value of a direct current supplied from the electric source means to the motor-driven compressor;

direct current voltage detecting means for detecting a d.c. voltage of the direct current supplied from the electric source means, the d.c. voltage being applied to the motor-driven compressor; and control means for controlling the motor-driven compressor to reduce the average value of the direct current supplied to the motor-driven compressor in cases where the average value detected by the average direct current detecting means is higher than an upper limit of the average value, the upper limit of the average value being determined in dependence on the d.c. voltage detected by the direct current voltage detecting means.

In the above configuration, the average value of the direct current supplied from the electric source means to the motor-driven compressor is detected by the average direct current detecting means, and the d.c. voltage of the direct current is detected by the direct current voltage detecting means.

In cases where the average value is too high, there is a probability that the automobile such as an electric car stops running before a driver arrives at his destination because the electric energy stored in the electric source means is exhausted. Also, there is a probability that the electric source means is overloaded and burns out in the automobile such as a gasoline car. To avoid the exhaustion or the overload, the upper limit of the average value is determined in dependence on the d.c. voltage, and the motor-driven compressor is controlled by the control means to reduce the average value of the direct current in cases where the average value is higher than the upper limit of the average value.

Accordingly, because electric power consumed in the compressor is controlled in dependence on the d.c. voltage, the automobile such as an electric car is not stalled by the exhaustion of the electric energy stored in the battery before the driver arrives at his destination. Also, the electric source means is not overloaded in the automobile such as a gasoline car.

BRIEF DESCRIPTION OF THE DRAWINGS

The objects, features and advantages of the present invention will be apparent from the following description taken in conjunction with the accompanying drawings, in which:

FIG. 3 is a flow chart showing a first operation performed in the driving control apparatus shown in FIG. 1;

DETAIL DESCRIPTION OF THE PREFERRED EMBODIMENTS

Preferred embodiments of a driving control apparatus of a motor-driven compressor according to the present invention are described with reference to drawings.

Figure 1:
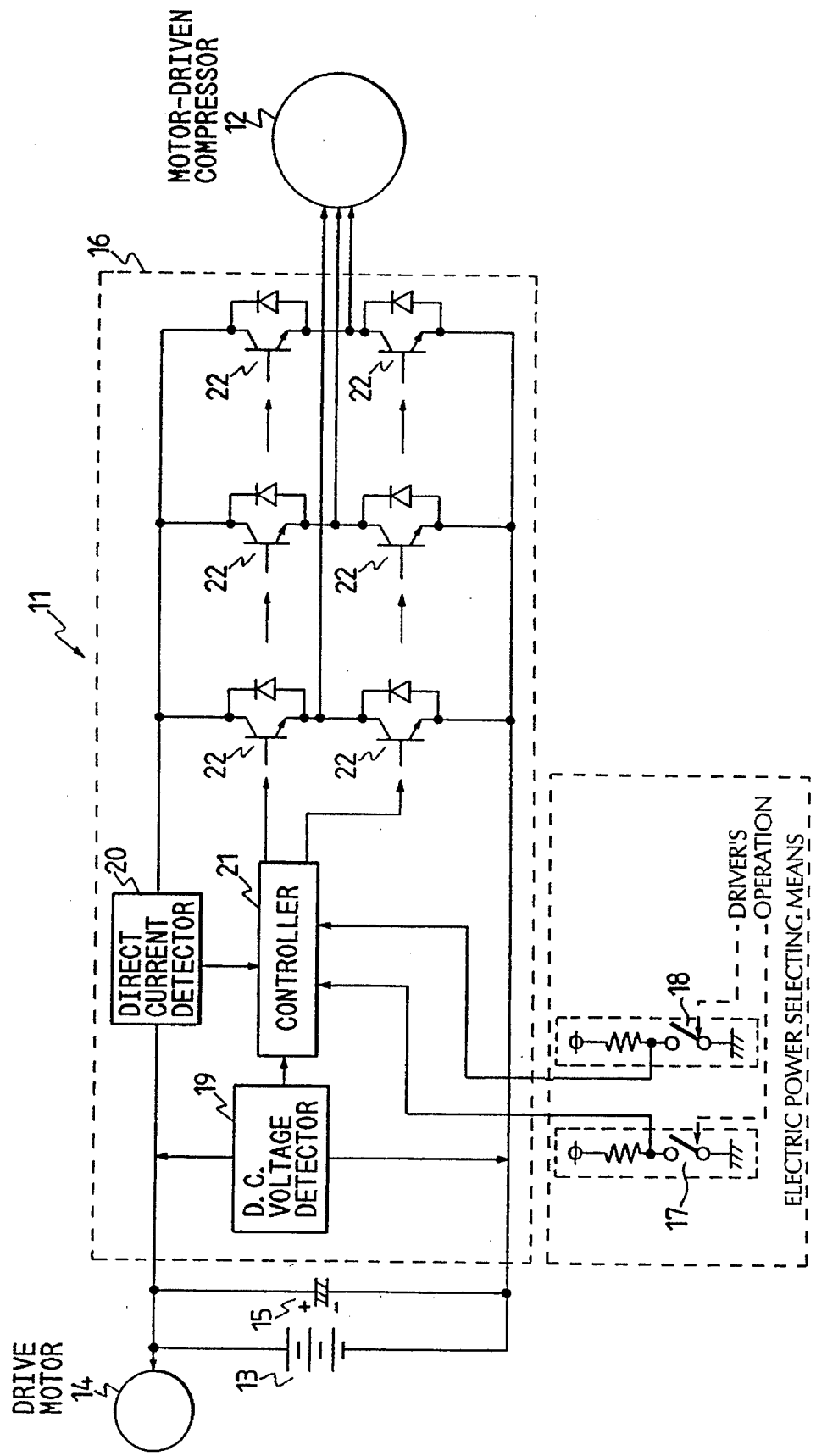
FIG. 1 is a combination of a constructional view and a block diagram showing a driving control apparatus of a motor-driven compressor according to a first embodiment of the present invention.

FIG. 1 is a combination of-a constructional view and a block diagram showing a driving control apparatus of a motor-driven compressor according to a first embodiment of the present invention.

As shown in FIG. 1, a driving control apparatus 11 of a motor-driven compressor 12 comprises a battery 13 for storing an electric energy to supply electric power to both the compressor 12 and a drive motor 14, a capacitor 15 arranged in parallel to the battery 13 for smoothing direct current (d.c.) voltage of the electric power supplied from the battery 13, an inverter 16 arranged between the battery 13 and the compressor 12 for converting the d.c. voltage of the electric power supplied to the compressor 12 into pseudo-alternating current voltage of which a value varies in a rectangular pulse train shape, a first output power selecting switch 17 for selecting a first upper limit of the electric power supplied from the battery 13 to the compressor 12 to give priority to air conditioning of the compressor 12, and a second output power selecting switch 18 for selecting a second upper limit of the electric power supplied from the battery 13 to the compressor 12 to give priority to the travelling of an electric motorcar. Either the first output power selecting switch 17 or the second output power selecting switch 18 is switched on by a driver to select either the first upper limit or the second upper limit.

Therefore, the first and second output power selecting switches 17, 18 function as an electric power selecting means for selecting either the first upper limit or the second upper limit as the upper limit of the electric power.

The inverter 16 comprises a d.c. voltage detector 19 for detecting a value $V_{DC}$ of the d.c. voltage, a direct current detector 20 for detecting a peak value $I_{PEAK}$ of direct current of the electric power supplied to the compressor 12 and an average value $I_{AVE}$ of the direct current, a controller 21 for controlling an upper limit $W_{MAX}$ of the electric power supplied to the compressor 12 according to the d.c. voltage $V_{DC}$ detected by the d.c. voltage detector 19, the average direct current $I_{AVE}$ detected by the direct current detector 20, and the selection of the first and second output power selecting switches 17, 18, and three pairs of switching devices 22 for producing the pseudo-alternating current voltage under the control of the controller 21. Transistors composing constitutional elements of the inverter 16 are formed by power transistors.

Figure 2A:
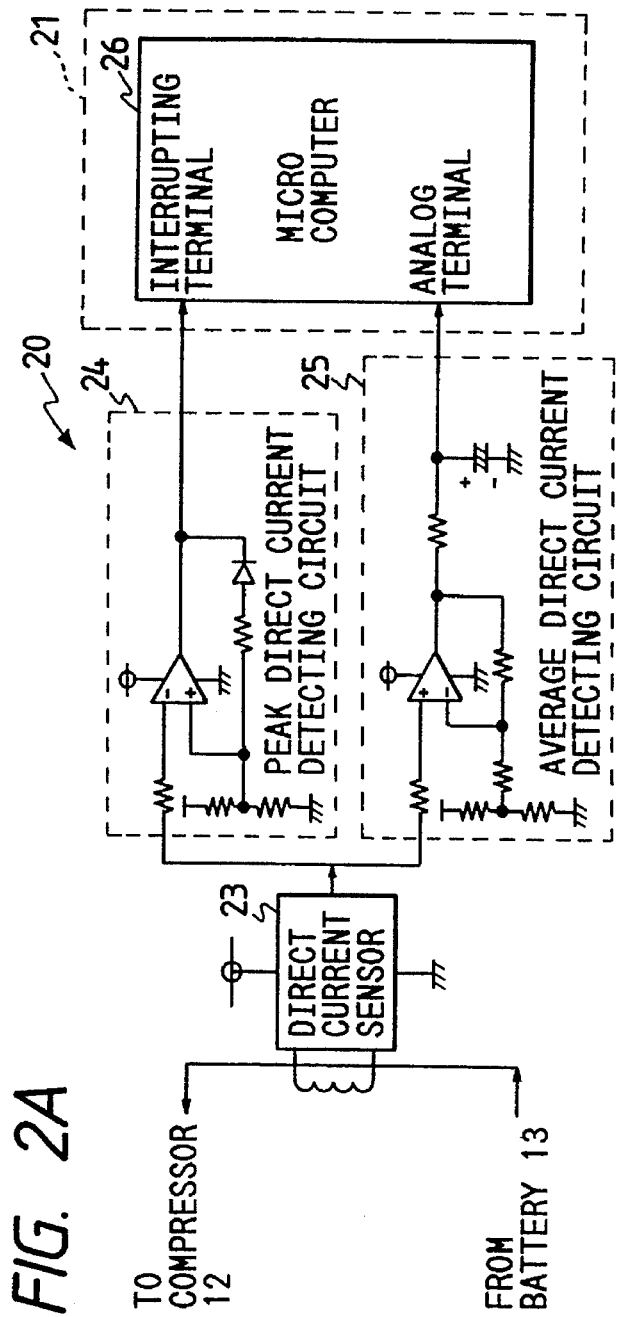
FIG. 2A is a circuit diagram of a direct current detector shown in FIG. 1.
Figure 2B:
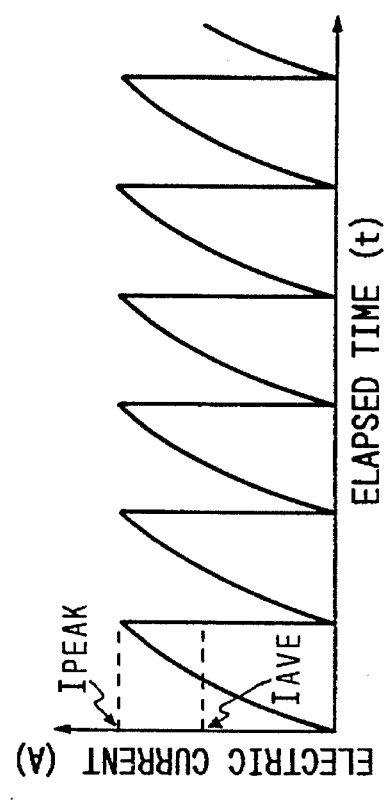
FIG. 2B shows a waveform of a direct current detected by a d.c. current sensor of the direct current detector shown in FIG. 2A.

FIG. 2A is a circuit diagram of the direct current detector 20 shown in FIG. 1. As shown in FIG. 2A, the direct current detector 20 comprises a direct current sensor 23 for detecting the direct current of which a waveform is in a serrate shape as shown in FIG. 2B, a peak direct current detecting circuit 24 for detecting the peak value $I_{PEAK}$ of the direct current detected by the direct current sensor 23, an average direct current detecting circuit 25 for detecting the average value $I_{AVE}$ of the direct current detected by the direct current sensor 23, and a microcomputer 26 arranged in the controller 21 for inputting the average value $I_{AVE}$ detected by the average direct current detecting circuit 25 to an analog terminal and inputting a "too high" signal from the peak direct current detecting circuit 24 to an interrupting terminal in cases where the peak value $I_{PEAK}$ is higher than an allowed value.

In the above configuration of the driving control apparatus 11, three types of operations performed in the apparatus 11 are described with reference to FIGS. 3, 4, and 5.

Figure 4:
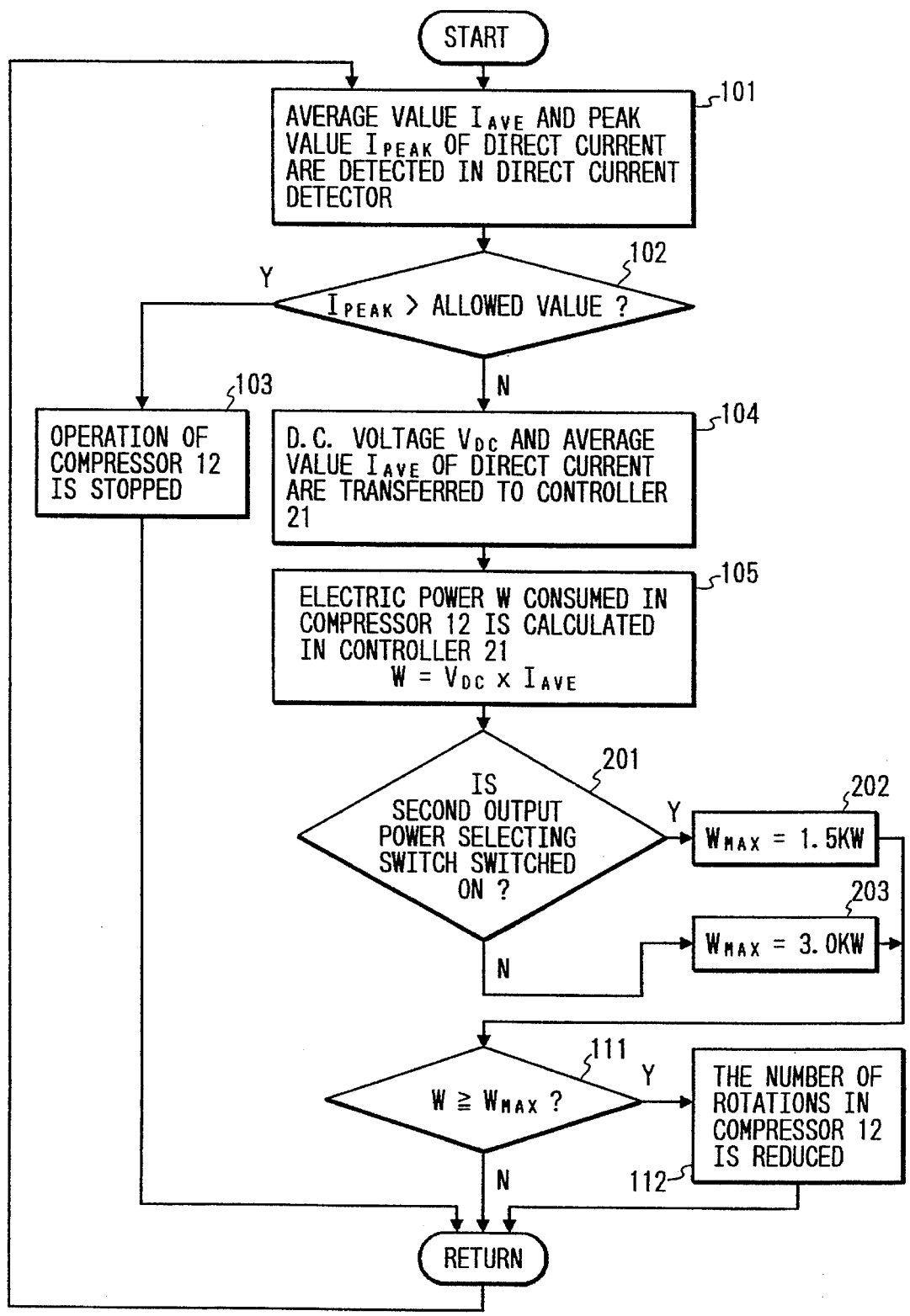
FIG. 4 is a flow chart showing a second operation performed in the driving control apparatus shown in FIG. 1.
Figure 5:
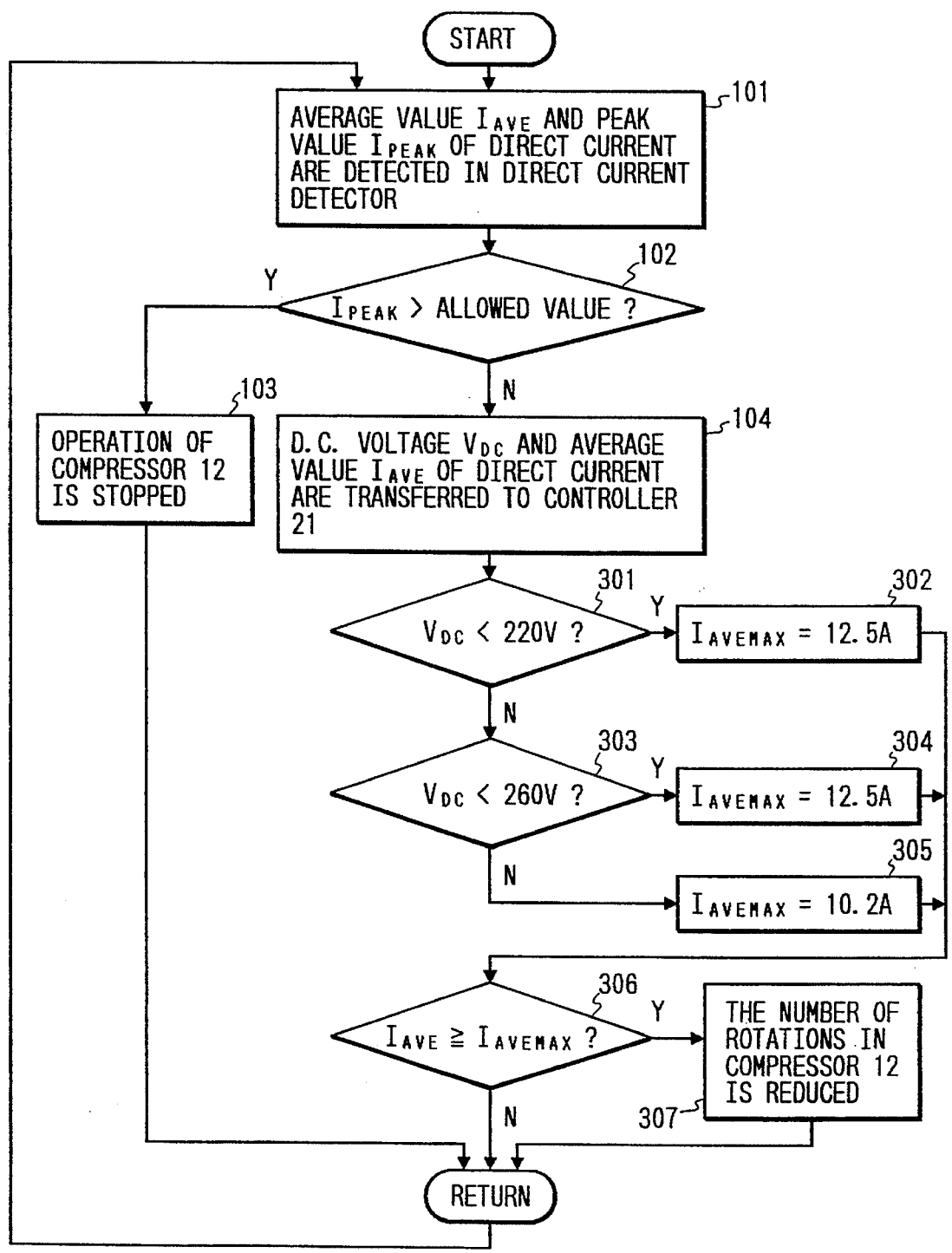
FIG. 5 is a flow chart showing a third operation performed in the driving control apparatus shown in FIG. 1.

FIG. 3 is a flow chart showing a first operation performed in the apparatus 11, FIG. 4 is a flow chart showing a second operation performed in the apparatus 11, and FIG. 5 is a flow chart showing a third operation performed in the apparatus 11.

Initially, the first operation is described. As shown in FIG. 3, the average value $I_{AVE}$ and the peak value $I_{PEAK}$ of the direct current are detected in the direct current detector 20 in a step 101, and whether or not the peak value $I_{PEAK}$ is larger than the allowed value is judged in the peak direct current detecting circuit 24 in a step 102. In cases where the peak value $I_{PEAK}$ is larger than the allowed value, the "too high" signal is transferred to the microcomputer 26 arranged in the controller 21. Therefore, in a step 103, the operation of the compressor 12 is promptly stopped under the control of the controller 21 to prevent the switching devices 22 formed by the power transistors from being damaged.

In cases where the peak value $I_{PEAK}$ is not larger than the allowed value, the d.c. voltage $V_{DC}$ detected by the d.c. voltage detector 19 and the the average value $I_{AVE}$ are transferred to the controller 21 in a step 104. Thereafter, an electric power W expected to be consumed in the compressor 12 is calculated in the controller 21 in a step 105. The consumed electric power W is defined as a product of the d.c. voltage $V_{DC}$ and the average value $I_{AVE}$. Thereafter, the upper limit $W_{MAX}$ of the consumed electric power is found in the controller 21 in dependence on the d.c. voltage $V_{DC}$ in steps 106 to 110.

In cases where the d.c. voltage $V_{DC}$ is lower than a first voltage 220 V, the upper limit $W_{MAX}$ of the consumed electric power is determined to 2.5 KW in the steps 106, 107. In cases where the d.c. voltage $V_{DC}$ ranges from the first voltage 220 V to a second voltage 260 V (220 V $\leq V_{DC} <$ 260 V), the upper limit $W_{MAX}$ of the consumed electric power is determined to 3.0 KW in the steps 106, 108, 109. In cases where the d.c. voltage $V_{DC}$ is equal to or larger than the second voltage 260 V, the upper limit $W_{MAX}$ of the consumed electric power is determined to 3.5 KW in the steps 106, 108, 110.

The reason that the upper limit $W_{MAX}$ of the consumed electric power depends on the d.c. voltage $V_{DC}$ is as follows. The compressor 12 and the power transistors contained in the inverter 16 are broken down and burn out in dependence on the average value $I_{AVE}$ of the direct current. Therefore, the upper limit $W_{MAX}$ of the consumed electric power is changed in inversely proportion to the change of the d.c. voltage $V_{DC}$ to maintain the average value $I_{AVE}$ of tile direct current at a constant value.

Thereafter, whether or not the consumed electric power W is higher than the upper limit $W_{MAX}$ is judged in the controller 21 in a step 111. In cases where the consumed electric power W is equal to or higher than the upper limit $W_{MAX}$, the number of rotations in the compressor 12 is reduced in a step 112 to decrease the electric power W actually consumed in the compressor 12. Also, in cases where the consumed electric power W is lower than the upper limit $W_{MAX}$, the operation returns to the step 101.

Accordingly, because the electric power consumed in the compressor 12 is necessarily lower than the upper limit $W_{MAX}$ of the consumed electric power, the electric car is not stalled by the exhaustion of the electric energy stored in the battery before a driver arrives at his destination.

Also, because the upper limit $W_{MAX}$ depends on the d.c. voltage $V_{DC}$, the average value $I_{AVE}$ of the direct current can be kept constant even though the d.c. voltage $V_{DC}$ varies. That is, the motor-driven compressor 12 and the power transistors can be prevented from burning out.

In addition, because the upper limit $W_{MAX}$ allowed to be consumed by the compressor 12 is minutely determined in dependence on the d.c. voltage $V_{DC}$, the air conditioning in the electric motorcar can be efficiently performed. Therefore, the driver and passengers can find pleasure in comfortable travelling.

Next, the second operation is described. As shown in FIG. 4, the average value $I_{AVE}$ and the peak value $I_{PEAK}$ of the direct current are detected in the direct current detector 20 in the step 101, and whether or not the peak value $I_{PEAK}$ is larger than the allowed value is judged in the peak direct current detecting circuit 24 in the step 102. In cases where the peak value $I_{PEAK}$ is larger than the allowed value, the "too high" signal is transferred to the microcomputer 26 arranged in the controller 21. Therefore, in the step 103, the operation of the compressor 12 is promptly stopped under the control of the controller 21. In cases where the peak value $I_{PEAK}$ is not larger than the allowed value, the d.c. voltage $V_{DC}$ detected by the d.c. voltage detector 19 and the the average value $I_{AVE}$ are transferred to the controller 21 in the step 104. Thereafter, an electric power W expected to be consumed in the compressor 12 is calculated in the controller 21 in the step 105. The consumed electric power W is defined as a product of the d.c. voltage $V_{DC}$ and the average value $I_{AVE}$. Thereafter, an upper limit $W_{MAX}$ of the consumed electric power is found in the controller 21 in dependence on the selection of the first and second output power selecting switches 17, 18 in steps 201 to 203.

In cases where the second output power selecting switch 18 is switched on by a driver, the upper limit $W_{MAX}$ is set to a first value 1.5 KW in the steps 201, 202 because the travelling of the electric motorcar has priority over the air conditioning of the compressor 12. Therefore, the electric energy stored in the battery 13 is expected to be mainly consumed for the travelling of the electric motorcar. In contrast, in cases where the first output power selecting switch 17 is switched on, the upper limit $W_{MAX}$ is set to a second value 3.0 KW in the steps 201, 203 because the air conditioning of the compressor 12 has priority over the travelling of the electric motorcar. Therefore, the electric energy stored in the battery 13 is expected to be consumed for not only the travelling of the electric motorcar but also the air conditioning. Thereafter, the operation of the apparatus 11 is performed according to the steps 111, 112 in the same manner as in the first operation shown in FIG. 3.

Accordingly, because the electric power consumed in the compressor 12 is necessarily lower than the upper limit $W_{MAX}$ of the consumed electric power, the electric car is not stalled by the exhaustion of the electric energy stored in the battery before a driver arrives at his destination.

Also, in cases where a driver switches on the second output power selecting switch 18, a sufficient electric power can be consumed to operate the drive motor. Therefore, drivability of the driver can be improved. In contrast, in cases where the driver switches on the first output power selecting switch 17, a sufficient electric power can be consumed for the air conditioning in the electric car. Therefore, the driver and passengers can find pleasure in comfortable travelling.

Next, the third operation is described. As shown in FIG. 5, the average value $I_{AVE}$ and the peak value $I_{PEAK}$ of the direct current are detected in the direct current detector 20 in the step 101, and whether or not the peak value $I_{PEAK}$ is larger than the allowed value is judged in the peak direct current detecting circuit 24 in the step 102. In cases where the peak value $I_{PEAK}$ is larger than the allowed value, the "too high" signal is transferred to the microcomputer 26 arranged in the controller 21. Therefore, in the step 103, the operation of the compressor 12 is promptly stopped under the control of the controller 21. In cases where the peak value $I_{PEAK}$ is not larger than the allowed value, the d.c. voltage $V_{DC}$ detected by the d.c. voltage detector 19 and the the average value $I_{AVE}$ are transferred to the controller 21 in the step 104. Thereafter, an upper limit $W_{MAX}$ of the consumed electric power is indirectly found in the controller 21 by determining an upper limit of the average value $I_{AVE}$ of the direct current in dependence on the d.c. voltage $V_{DC}$ in steps 301 to 305.

In cases where the d.c. voltage $V_{DC}$ is lower than a first voltage 220 V, the upper limit $I_{AVEMAX}$ of the average value $I_{AVE}$ is determined to 12.5 A in the steps 301, 302. In cases where the d.c. voltage $V_{DC}$ ranges from the first voltage 220 V to a second voltage 260 V (220 V $\leq V_{DC}$<260 V), the upper limit $I_{AVEMAX}$ of the average value $I_{AVE}$ is determined to 12.5 A in the steps 301, 303, 304. In cases where the d.c. voltage $V_{DC}$ is equal to or larger than the second voltage 260 V, the upper limit $I_{AVEMAX}$ of the average value $I_{AVE}$ is determined to 10.2 A in the steps 301, 303, 305.

Thereafter, whether or not the average value $I_{AVE}$ is higher than the upper limit $I_{AVEMAX}$ is judged in the controller 21 in a step 306. In cases where the average value $I_{AVE}$ is equal to or higher than the upper limit $I_{AVEMAX}$, the number of rotations in the compressor 12 is reduced in a step 307 to decrease the electric power W actually consumed in the compressor 12. Also, in cases where the average value $I_{AVE}$ is lower than the upper limit $I_{AVEMAX}$, the operation returns to the step 101.

Accordingly, because the upper limit $I_{AVEMAX}$ of the average value $I_{AVE}$ is reduced as the d.c. voltage $V_{DC}$ is increased, the upper limit $W_{MAX}$ of the consumed electric power is kept constant because the upper limit $W_{MAX}$ is defined as a product of the upper limit $I_{AVEMAX}$ and the d.c. voltage $V_{DC}$. Therefore, the electric power consumed in the compressor 12 is necessarily lower than the upper limit $W_{MAX}$ of the consumed electric power, so that the electric car is not stalled by the exhaustion of the electric energy stored in the battery before a driver arrives at his destination.

Also, the electric power consumed in the compressor 12 can be constant regardless of the variation of the d.c. voltage $V_{DC}$. In other words, a driver and passengers can find pleasure in comfortable travelling because the electric power consumed for the air conditioning in the electric car can be kept constant even though the d.c. voltage $V_{DC}$ varies.

In the driving control apparatus 11 according to the first embodiment, the battery 13 is mounted on the electric motorcar. However, the present invention is not limited to the battery 13 and the electric motorcar. That is, it is available that an electric generator be mounted on a gasoline car. In this case, the electric generator is not overloaded when one of the first to third operation is performed. Therefore, the electric generator can be prevented from burning out.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A driving control apparatus for supplying electric power to a motor-driven compressor mounted on an automobile, comprising:

electric source means for storing an electric energy to be supplied to the motor-driven compressor;

direct current detecting means for detecting a direct current supplied from the electric source means to the motor-driven compressor;

direct current voltage detecting means for detecting a d.c. voltage of the direct current supplied from the electric source means, the d.c. voltage being applied to the motor-driven compressor; and control means for calculating an electric power obtained by multiplying the direct current detected by the direct current detecting means and the d.c. voltage detected by the direct current voltage detecting means together, for comparing the electric power to an upper limit of the electric power, and for controlling the motor-driven compressor to reduce the electric power consumed by the motor-driven compressor to an electric power value lower than the upper limit in cases where the electric power is larger than the upper limit;

wherein the direct current detecting means comprises:
a peak direct current detecting circuit for detecting a peak value of the direct current, wherein the control means stops operation of the motor-driven compressor, which is under control of the control means, in cases where the peak value of the direct current is determined by the control means to be higher than an allowable peak limit of the peak value; and an average direct current detecting circuit for detecting an average value of the direct current, wherein the electric power is calculated by the control means by multiplying the average value and the d.c. voltage detected by the direct current voltage detecting means together.

2. An apparatus according to claim 1 in which the upper limit of the electric power is determined by the control means according to the d.c. voltage detected by the direct current voltage detecting means.

3. An apparatus according to claim 1, additionally including electric power selecting means for selecting either a first upper limit or a second upper limit lower than the first upper limit as the upper limit of the electric power, wherein the first or second upper limit selected by the electric power selecting means is compared with the electric power by the control means to reduce the electric power to the first or second upper limit selected by the electric power selecting means in cases where the electric power is larger than the first or second upper limit.

4. An apparatus according to claim 1, wherein the control means reduces the electric power supplied to the motor-driven compressor to lower the number of rotations in the motor-driven compressor.

5. An apparatus according to claim 1, additionally including switching device means for converting the d.c. voltage of the direct current supplied from the electric source means into alternating current voltage having a value that varies in shape as a rectangular pulse train under control of the control means, wherein the motor-driven compressor is operated by the pseudo-alternating current voltage.

6. A driving control apparatus for supplying electric power to a motor-driven compressor mounted on an automobile, comprising:

electric source means for storing an electric energy to be supplied to the motor-driven compressor;

average direct current detecting means for detecting an average value of a direct current supplied from the electric source means to the motor-driven compressor;

direct current voltage detecting means for detecting a d.c. voltage of the direct current supplied from the electric source means, the d.c. voltage being applied to the motor-driven compressor; and control means for comparing the average value of the direct current detected by the average direct current detecting means to an upper limit of the average value and for controlling the average value of the direct current supplied to the motor-driven compressor in cases where the average value detected by the average direct current detecting means is higher than the upper limit of the average value, wherein the upper limit of the average value is determined by the control means according to the d.c. voltage detected by the direct current voltage detecting means.

7. An apparatus according to claim 6, additionally including:

peak direct current detecting means for detecting a peak value of the direct current supplied from the electric source means to the motor-driven compressor, wherein the control means compares the peak value of the direct current with an upper peak limit of the peak value of the direct current and stops operation of the motor-driven compressor, which is under control of the control means, in cases where the peak value of the direct current is higher than the upper peak limit of the peak value.

8. An apparatus according to claim 6, wherein the control means sets the upper limit of the average value to keep an electric power consumed by the motor-driven compressor to a constant value, and wherein the control means calculates the electric power as a product of the average value of the direct current detected by the average direct current detecting means and the d.c. voltage detected by the direct current voltage detecting means.

9. An apparatus according to claim 6 wherein the control means reduces the average value of the direct current supplied to the motor-driven compressor to lower the number of rotations in the motor-driven compressor.

10. An apparatus according to claim 6, additionally including switching device means for converting the d.c. voltage of the direct current supplied from the electric source means into alternating current voltage having a value that varies in shape as a rectangular pulse train under control of the control means, wherein the motor-driven compressor is operated by the alternating current voltage.

* * * * *